US008196356B2

(12) United States Patent
Allen et al.

(10) Patent No.: US 8,196,356 B2
(45) Date of Patent: Jun. 12, 2012

(54) VEHICLE WINDOW MOUNTING ASSEMBLY

(75) Inventors: Randy C. Allen, Rochester, MI (US); David T. Renke, Macomb, MI (US); Obadiah Fitzpatrick, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 524 days.

(21) Appl. No.: 12/326,975

(22) Filed: Dec. 3, 2008

(65) Prior Publication Data

US 2009/0079231 A1    Mar. 26, 2009

Related U.S. Application Data

(63) Continuation-in-part of application No. 11/425,424, filed on Jun. 21, 2006, now abandoned.

(51) Int. Cl.
*E06B 3/00* (2006.01)

(52) U.S. Cl. ............... 49/506; 49/502; 49/374; 49/375; 49/350; 296/201; 296/146.2

(58) Field of Classification Search .............. 49/502, 49/506, 374, 375, 350; 296/146.16, 201, 296/146.2
See application file for complete search history.

(56) References Cited

U.S. PATENT DOCUMENTS

| | | | | |
|---|---|---|---|---|
| 1,676,441 A * | 7/1928 | Jackson | ............ | 188/69 |
| 1,751,993 A * | 3/1930 | Goldsmith et al. | ............. | 49/350 |
| 1,772,759 A * | 8/1930 | Rickel et al. | ............. | 49/350 |
| 2,120,115 A * | 6/1938 | Roethel | ............. | 49/146 |
| 2,296,811 A * | 9/1942 | Devercaux | ............. | 49/350 |
| 3,050,332 A * | 8/1962 | Arnold, Jr. | ............. | 49/227 |
| 3,591,982 A * | 7/1971 | Nantau | ............. | 49/227 |
| 3,868,788 A * | 3/1975 | Podolan | ............. | 49/374 |
| 4,119,341 A * | 10/1978 | Cook | ............. | 296/146.16 |
| 4,561,689 A * | 12/1985 | Sprenger | ............. | 296/96.21 |
| 4,659,138 A * | 4/1987 | Gosse et al. | ............. | 296/201 |
| 4,762,904 A * | 8/1988 | Nakama | ............. | 428/122 |
| 4,779,919 A * | 10/1988 | Muller | ............. | 296/201 |
| 4,800,681 A * | 1/1989 | Skillen et al. | ............. | 49/440 |
| 4,905,432 A * | 3/1990 | Romie | ............. | 52/208 |
| 4,912,895 A * | 4/1990 | Harris, Jr. | ............. | 52/208 |
| 4,991,351 A * | 2/1991 | Bertolini | ............. | 49/351 |
| 5,083,835 A * | 1/1992 | Rossini | ............. | 296/201 |
| 5,152,576 A * | 10/1992 | Ris | ............. | 296/201 |
| 5,163,731 A * | 11/1992 | Gold | ............. | 296/201 |
| 5,243,785 A * | 9/1993 | Nieboer et al. | ............. | 49/375 |
| 5,310,240 A * | 5/1994 | Andre et al. | ............. | 296/201 |
| 5,338,087 A | 8/1994 | Gross et al. | | |
| 5,497,578 A * | 3/1996 | Wautelet et al. | ............. | 49/349 |
| 5,531,496 A * | 7/1996 | Zbinden et al. | ............. | 296/96.21 |
| 5,622,005 A * | 4/1997 | Ochenski et al. | ............. | 49/375 |
| 5,625,981 A * | 5/1997 | Klein et al. | ............. | 49/227 |

(Continued)

*Primary Examiner* — Katherine w Mitchell
*Assistant Examiner* — Marcus Menezes (57) ABSTRACT

The invention concerns a window assembly in a vehicle having a window pane that is fixed in a window frame that is also used for movable windows, and a method for mounting the fixed window pane in the window assembly. The method may include: mounting a window mounting assembly to a vehicle structure adjacent to the window opening; sliding the window pane into run channels of the vehicle window frame; mounting a lower edge of the window pane onto a peripheral support surface of a window support cam of the window mounting assembly; rotating a cam lobe of the window support cam into contact with the lower edge of the window pane until the window pane slides upward into a fully closed position; and locking the window support cam, against rotation allowing the window pane to lower, as the window pane is lifted into the fully closed position.

7 Claims, 5 Drawing Sheets

U.S. PATENT DOCUMENTS

| | | | |
|---|---|---|---|
| 5,765,310 A * | 6/1998 | Gold | 49/375 |
| 6,152,636 A * | 11/2000 | Nass | 403/13 |
| 6,349,504 B1 * | 2/2002 | Schmitt | 49/375 |
| 6,571,515 B1 | 6/2003 | Samways et al. | |
| 6,598,345 B1 * | 7/2003 | Arimoto et al. | 49/374 |
| 6,616,216 B2 * | 9/2003 | Furuyama et al. | 296/146.7 |
| 6,902,224 B2 * | 6/2005 | Weinert et al. | 296/146.16 |
| 7,434,870 B2 * | 10/2008 | Kinoshita et al. | 296/193.06 |
| 7,837,251 B2 * | 11/2010 | Rich et al. | 296/146.15 |
| 2004/0088924 A1 * | 5/2004 | Moser et al. | 49/375 |
| 2006/0265965 A1 * | 11/2006 | Butera et al. | 49/502 |
| 2007/0022665 A1 * | 2/2007 | Bigourden et al. | 49/375 |
| 2007/0119100 A1 * | 5/2007 | Nakada et al. | 49/350 |
| 2009/0256398 A1 * | 10/2009 | Ota | 296/201 |

* cited by examiner

VEHICLE WINDOW MOUNTING ASSEMBLY

CROSS REFERENCE TO RELATED APPLICATIONS

This application is a continuation-in-part and claims the benefit of U.S. patent application Ser. No. 11/425,424, filed Jun. 21, 2006, which is incorporated herein by reference.

BACKGROUND OF INVENTION

The present invention relates generally to a window in a vehicle, and in particular to a mounting assembly for a vehicle window.

For some automotive vehicles, customers are offered an option—for certain windows on the vehicle—to have fixed glass or a window that can open. The windows that can open typically have a window pane that slides in guide channels between inner and outer portions of a seal in a window opening. The opening and closing motion may be driven by a hand crank, a so-called manually opening window, or by a motor, a so-called power window. For the fixed glass configuration, the window pane is typically bonded in place over the window opening with urethane and encapsulated with a rubber weatherstrip surround.

The look of the window for a fixed glass window, then, is different from the look of the window in the same vehicle when a moving window option is chosen. Moreover, the shape of the window pane is different for the two, requiring two different shaped pieces of glass, one for each type of construction. This also requires a different door/vehicle body construction for fixed and moving glass systems. Thus, the application of two different mounting techniques for fixed and moving window options in a particular vehicle is undesirable, since it does not allow a particular vehicle to have a common appearance for the different window options, and it requires a different construction for the window pane and structure.

In order to overcome these drawbacks, some have employed a window pane and door construction for a movable window—whether or not the window pane is meant to be fixed. For the movable window configurations, the usual manual or power window mechanisms (also called regulators) are employed. For a fixed window, most of the manual window mechanism is installed. The window pane is also installed and mounted to the manual window mechanism. Then, the mechanism is used once at the assembly plant to move the window pane into the full up (closed) position, and is locked in this position. No window crank handle is put on the inside of the door so it can never be rolled down. This gives the customer a fixed glass window while maintaining the same look of vehicles whether they have a fixed window, manually opening, or a power opening window. Moreover, the same window pane and essentially the same door construction can be employed for all of the configurations. However, this one time use of the manual regulator assembly includes most of the components necessary for a manually opening window, such as a cable system, clutch drive mechanism, long rails for guiding the window to its full up and down positions, etc. So this configuration adds significantly to the weight, number of parts, complexity and cost of the more conventional fixed window.

SUMMARY OF INVENTION

An embodiment contemplates a window mounting assembly for mounting a window pane between an inner and an outer portion of a window sealing assembly of a window opening in a vehicle. The assembly may comprise a cam support configured to mount to a vehicle structure, a window support cam and a cam lock. The window support cam may be mounted to the cam support and pivotable about a cam axis, with the window support cam having a lobe portion extending away from the cam axis and a peripheral window support surface for supporting a lower edge of the window pane. The cam lock may include a ratchet gear rotationally fixed to the window support cam and a ratchet arm configured to selectively prevent the lobe portion of the window support cam from rotating in a direction that allows the window pane to drop.

An embodiment contemplates a window mounting assembly for mounting a window pane between an inner and an outer portion of a window sealing assembly of a window opening in a vehicle. The assembly may comprise a cam support configured to mount to a vehicle structure, a window support cam and a cam lock. The window support cam may be mounted to the cam support and pivotable about a cam axis, with the window support cam having a lobe portion extending away from the cam axis and a peripheral window support surface for supporting a lower edge of the window pane. The cam lock may include a tension spring having a first end and an opposed second end, with the first end connected to the window support cam adjacent to the lobe portion and the second end fixed relative to vehicle structure at a location that will create a pivot inflection point for the window support cam such that when the window support cam is rotated to a first side of the inflection point the lobe portion will be pulled down away from the window pane and when the window support cam is rotated to a second side of the inflection point the lobe portion will be pulled up toward the window pane to thereby support a lower edge of the window pane.

An embodiment contemplates a method of fixedly mounting a window pane in a window opening of a vehicle window frame, the method comprising the steps of: mounting a window mounting assembly to a vehicle structure adjacent to the window opening; sliding the window pane into run channels of the vehicle window frame; mounting a lower edge of the window pane onto a peripheral support surface of a window support cam of the window mounting bracket assembly; rotating a cam lobe of the window support cam into contact with the lower edge of the window pane until the window pane slides upward through the run channels into a fully closed position; and locking the window support cam, against rotation allowing the window pane to lower, as the window pane is lifted into the fully closed position.

An advantage of an embodiment is that the window mounting bracket assembly allows for the use of the same window pane, same sealing assembly, and same door in white for both movable and fixed windows, while not incurring the unneeded extra expense, parts, assembly time and weight of a manual window regulator for a fixed window.

An advantage of an embodiment is that, while the window pane acts as a fixed window (in a fixed window application), the window mounting bracket assembly still allows for variation in build tolerances and adjustment of the window pane, should servicing needs require this. Moreover, when service of the window pane is needed, the window mounting bracket assembly can be reused.

An advantage of an embodiment is that seal set that occurs over time is accounted for to assure a good seal between the window pane and the sealing assembly.

DETAILED DESCRIPTION

Figure 1:
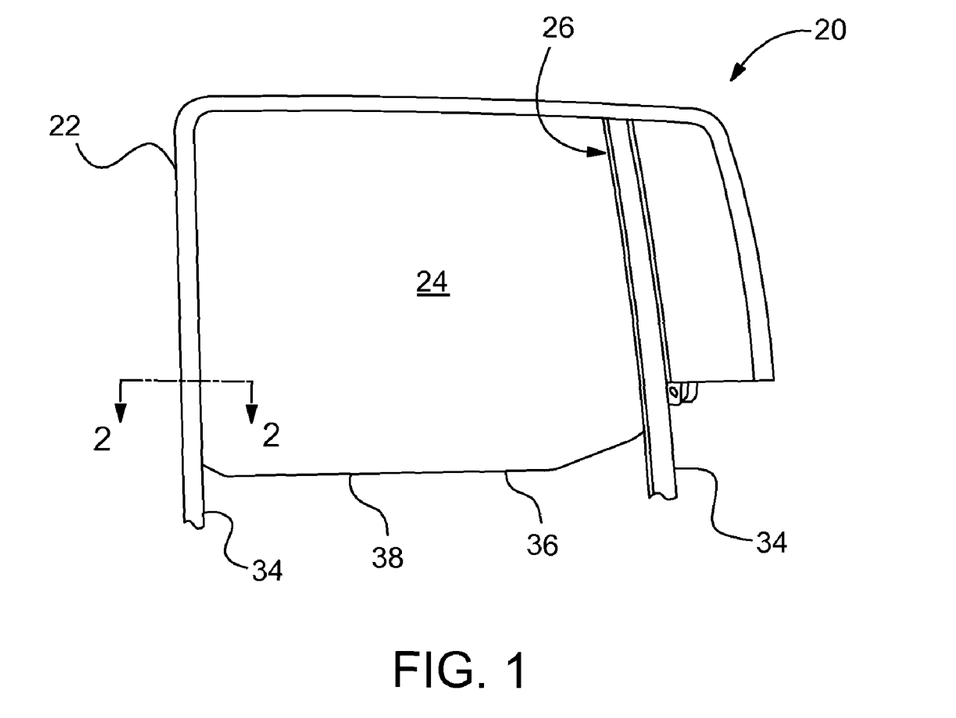
FIG. 1 is a partially schematic perspective view of a portion of a vehicle window assembly.
Figure 2:
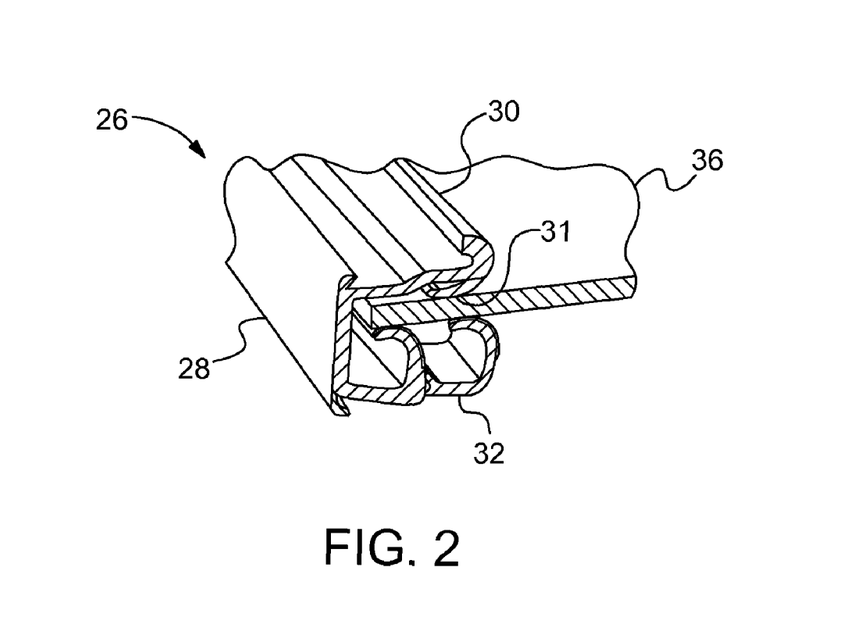
FIG. 2 is a section cut, on an enlarged scale, taken along line 2-2 in FIG. 1, but without the run channel shown.

FIGS. 1 and 2 illustrate a vehicle window assembly, indicated generally at 20, that includes a window frame 22 defining a window opening 24. Extending along the window frame 22 around the window opening 24 is a sealing assembly 26. The sealing assembly 26 includes a window seal 28 (also called a weatherstrip) having an inner portion 30 facing into the vehicle and an outer portion 32 facing outward from the vehicle, with a gap 31 defined between them. The window frame 22 also includes window run channels 34, within which portions of the sealing assembly 26 are mounted. The window run channels 34 retain and guide a window pane 36 in the gap 31, while allowing the window pane 36 to slide up and down. The vehicle window assembly 20 illustrated in FIGS. 1 and 2 allows for use of the conventional manual and power window regulators as well as a window mounting bracket assembly 40, which will be discussed relative to FIGS. 3-7.

FIGS. 3-7 illustrate the vehicle window assembly 20 as part of a vehicle door assembly, indicated generally at 42. While this embodiment illustrates a window frame 22 defining a window opening 24 in the door assembly 42, the present invention can be employed anywhere on a vehicle where there is an option between a fixed window and a moving window, such as, for example a rear door on an extended cab pickup, a van sliding door, or a back light of a pickup truck.

Figure 6:
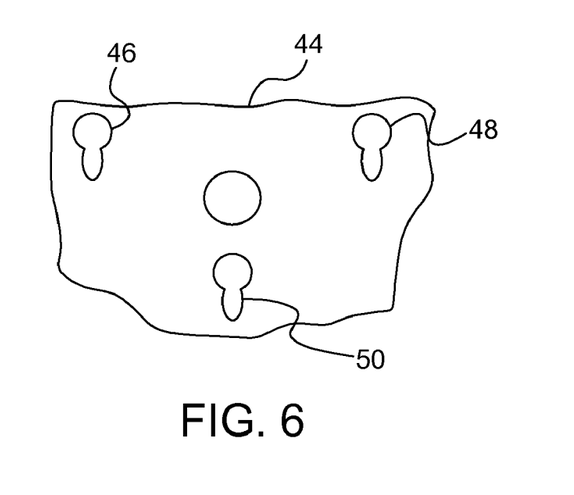
FIG. 6 is a schematic elevation view of a portion of a door frame.

A door frame 44 of the door assembly 42 includes three slotted mounting holes 46 located below the window opening 24. Each slotted mounting hole 46 may include a larger diameter upper portion 48 and a smaller diameter lower portion 50. Although three holes 46 are shown in this embodiment, other numbers may be employed instead, if so desired.

Figure 7:
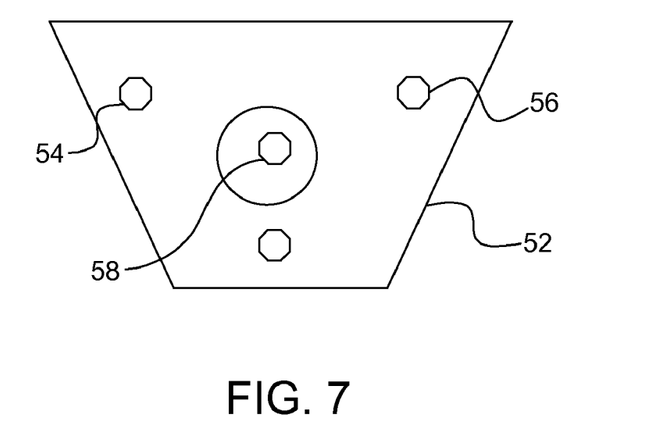
FIG. 7 is a schematic elevation view of a bracket support plate and fasteners.

The window mounting bracket assembly 40 includes a bracket support plate 52, having three mounting fasteners 54 extending therefrom and located so that each one aligns with a respective one of the slotted mounting holes 46. Each mounting fastener 54 includes a head 56 that is small enough to be received through a respective one of the upper portions 48, but is large enough that it cannot slide through the corresponding lower portion 50. While fasteners and holes are illustrated as a means for mounting the support plate to vehicle structure, other means of mounting may be employed instead, if so desired.

Figure 4:
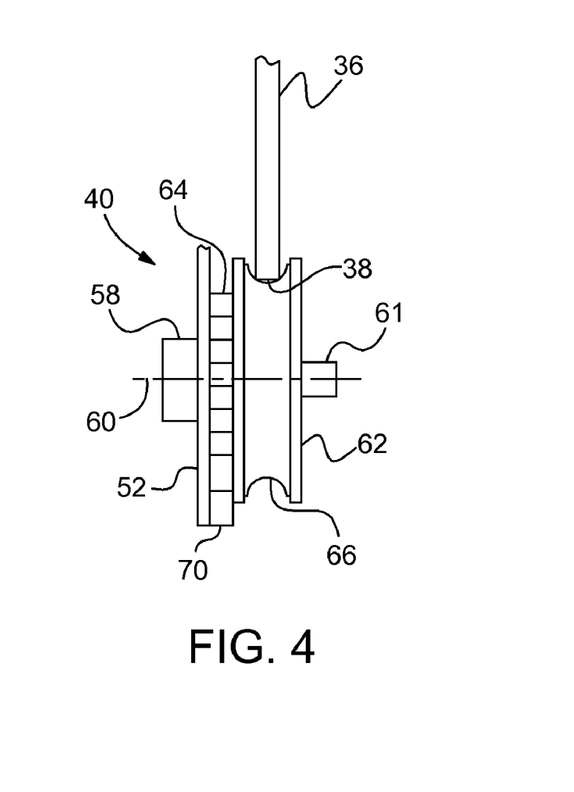
FIG. 4 is a schematic, side view of a window mounting bracket assembly.
Figure 5:
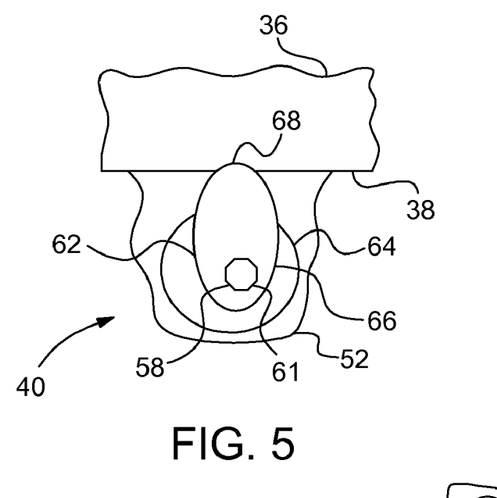
FIG. 5 is a schematic elevation view of the window mounting bracket assembly.

A cam shaft 58 extends through the bracket support plate 52 and is centered about a cam axis 60. The cam shaft 58 also includes a cam rotation feature 61.

A window support cam 62 is mounted on the cam shaft 58 and is spaced from the bracket support plate 52 by a spacer 64.

The window support cam 62 includes a peripheral support surface 66 for supporting a lower edge 38 of the window pane 36. The shape of the peripheral support surface 66 may be a semi-cylindrical concave surface for receiving and centering the window pane 36 relative to the window support cam 62. This surface may have a different shape, if so desired. The window support cam 62 includes a cam lobe 68, where the peripheral support surface 66 extends farther from the cam axis 60 than at other locations along the peripheral support surface 66.

The window mounting bracket assembly 40 also includes a cam lock 70. The cam lock 70 can be inserted between the bracket support plate 52 and the window support cam 62 to lock the two together so they cannot rotate relative to each other. With the cam lock 70 removed, the window support cam 62 can rotate relative to the bracket support plate 52, particularly when driven by the cam rotation feature 61.

The installation procedure for installing a fixed window configuration with the window mounting bracket assembly 40 will now be discussed. The window mounting bracket assembly 40 is assembled. The bracket support plate 52 is attached to the door frame 44 (which may be a door inner panel) by mounting the heads 56 of the mounting fasteners 54 in the upper portions 48 of the three slotted mounting holes 46 and sliding the plate 52 down. The heads 56 are now trapped in the lower portions 50 of the holes 46.

Figure 3:
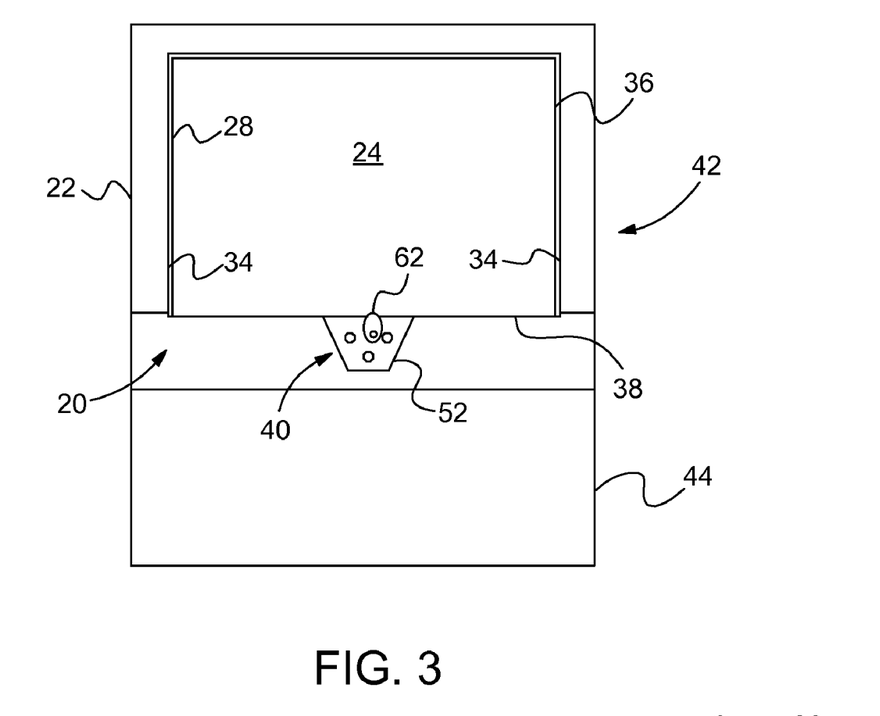
FIG. 3 is a schematic elevation view of a portion of a door and window assembly.

The window pane 36 is then loaded into the window frame 22 by sliding it up in the window run channels 34 between the inner and outer portions 30, 32 of the window seal 28. The lower edge 38 of the window pane 36 is mounted in the peripheral support surface 66 of the window support cam 62 while the support cam 62 is oriented so that it is at or near its lowest position (i.e., the cam lobe 68 is not extending upward). Then, the window support cam 62 is rotated (using the cam rotation feature 61, if desired) to rotate the cam lobe 68 upward, thus pushing the window pane 36 into its full up (closed) position. The cam lock 70 is then inserted into the mounting bracket assembly 40 to lock the support cam 62 in position and thus lock the window pane 36 permanently in the fully closed position. This also holds the mounting fasteners 54 in the lower portion 50 of the slotted mounting holes 46 so the heads 56 cannot slide out of the upper portions 48 of the mounting holes 46.

Figure 8:
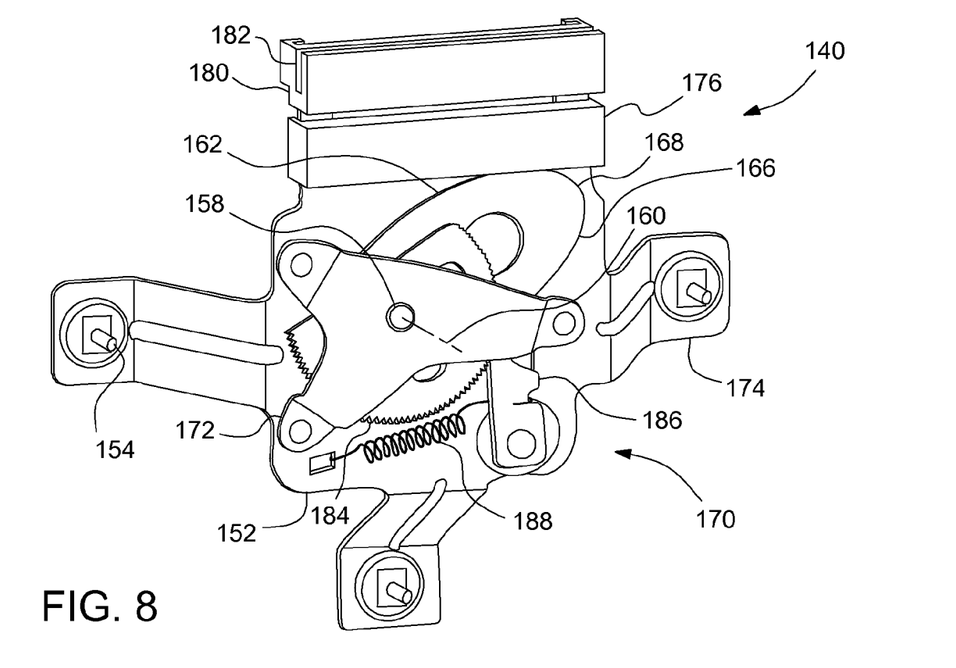
FIG. 8 is a perspective view of a window mounting bracket assembly according to a second embodiment.
Figure 9:
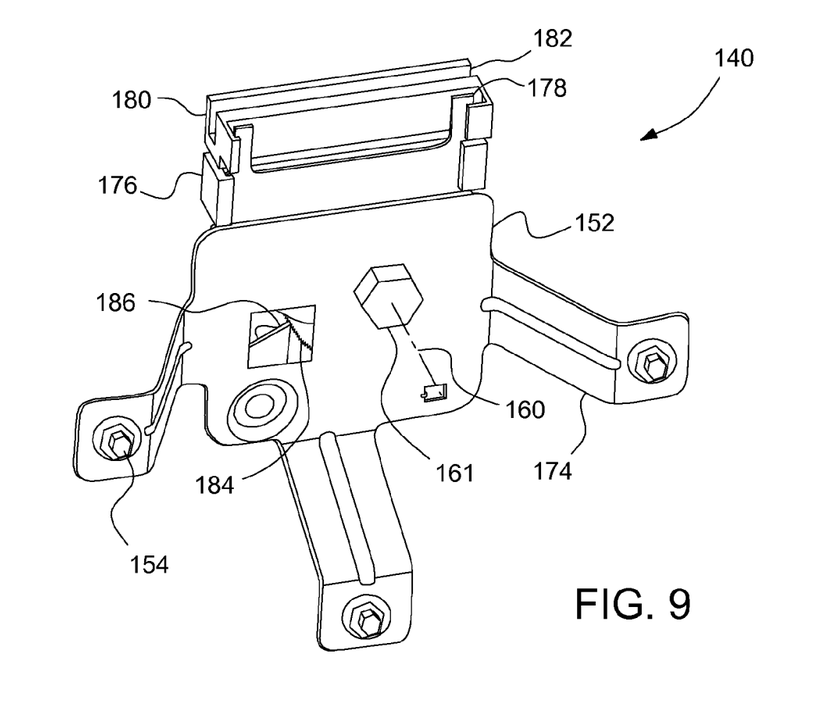
FIG. 9 is another perspective view of the window mounting bracket according to the second embodiment.

FIGS. 8 and 9 illustrate a second embodiment of the window mounting bracket assembly 140. Since this embodiment is similar to the first, similar element numbers will be used for similar elements, but employing 100-series numbers. The window mounting bracket assembly 140 includes a bracket support plate 152, having three support arms 174 extending therefrom, with a mounting fastener 154 supported by and extending from each arm 174 and located so that each fastener 154 aligns with a respective one of the slotted mounting holes (shown in FIG. 6).

A cam shaft 158 extends through the bracket support plate 152 and is centered about a cam axis 160. The cam shaft 158 is supported at its other end by a shaft support plate 172. A cam rotation feature 161 is included on the cam shaft 158. A window support cam 162 is also mounted on the cam shaft 158 and is rotationally fixed relative to the cam shaft 158 and the cam rotation feature 161. The window support cam 162 includes a peripheral support surface 166 for supporting a bearing member 176 that can slide up and down on clip supports 178 extending from the bracket support plate 152. A glass clip 180 is also mounted on the clip supports 178 and can be pushed up into contact with a lower edge of the window pane (shown in FIGS. 3 and 4). The glass clip 180 may include a slot 182 for receiving and supporting the lower edge of the window pane. The window support cam 162 includes a cam lobe 168, where the peripheral support surface 166 extends farther from the cam axis 160 than at other locations along the peripheral support surface 166.

The window mounting bracket assembly 140 also includes a cam lock 170. The cam lock 170 includes a ratchet gear 184 that is mounted on the cam shaft 158 and rotationally fixed relative to the window support cam 162. The cam lock 170 also includes a ratchet arm 186 that is pivotally mounted on the bracket support plate 152 and can pivot into contact with teeth on the ratchet gear 184. The ratchet arm 186 is oriented relative to the gear 184 so that, when in contact, the ratchet arm 186 will only allow rotation of the ratchet gear 184—and hence the window support cam 162—in one direction (counterclockwise as seen in FIG. 8). A cam spring 188 is connected at one end to the ratchet arm 186 and connected at the opposite end to the bracket support plate 152 at a location that will cause the cam spring 188 to be in tension, biasing the ratchet arm 186 into contact with the ratchet gear 184.

The installation procedure for installing a fixed window configuration with the window mounting bracket assembly 140 will now be discussed. Preferably, the window mounting bracket assembly 140 comes to a vehicle assembly plant in a shipped position with the window support cam 162 rotated so the cam lobe 168 extends away from the vertical position. The window support cam 162 may be held in this shipped position by securing the cam rotation feature 161 relative to the bracket support plate 152.

Then, the bracket support plate 152 is attached to the door frame. This may entail attaching the three mounting fasteners 154 to the slotted mounting holes in the door structure. The window pane is loaded into the window frame by sliding it up in the window run channels between the inner and outer portions of the window seal. The same door-in-white assembly, with the same window run channels and window seal are used for vehicles with power windows, manual window, or, in this case, a fixed window pane. The lower edge of the window pane is mounted in the slot 182 of the glass clip 180, providing one central support to hold the bottom of the window pane.

Then, the cam rotation feature 161 is released from the bracket support plate 152 and is rotated clockwise (as seen in FIG. 9). This will cause the window support cam 162 to rotate, pushing the cam lobe 168 into the bearing member 176. As the window support cam 162 is rotated further, the cam lobe 168 will push the bearing member 176 into the glass clip 180, which, in turn, pushes upward on the window pane. This pushes the window pane into its full up (closed) position. As the window support cam 162 rotates to push the window pane up into its closed position, the ratchet gear 184 rotates with the cam 162. The ratchet arm 186 slides along the gear teeth as the cam 162 is rotating counterclockwise (as seen in FIG. 8), but engages the teeth to prevent rotation in the other direction. Thus, the window pane ends up locked in its closed position by the cam lock 170.

Even though the cam lock 170 provides a positive lock of the cam position, the engagement of the ratchet arm 186 to the ratchet gear 184 allows the cam to be rotated further if the portion of the seal along the upper edge of the window pane gives over time. In addition, if repair or replacement of the window pane is needed, one may pivot the ratchet arm 186 away from the ratchet gear 184 (against the bias of the cam spring 188), releasing the window support cam 162. The cam lobe 168 can then be moved out of the way. With the cam lobe 168 pivoted away, the window pane can be removed and replaced.

Figure 10:
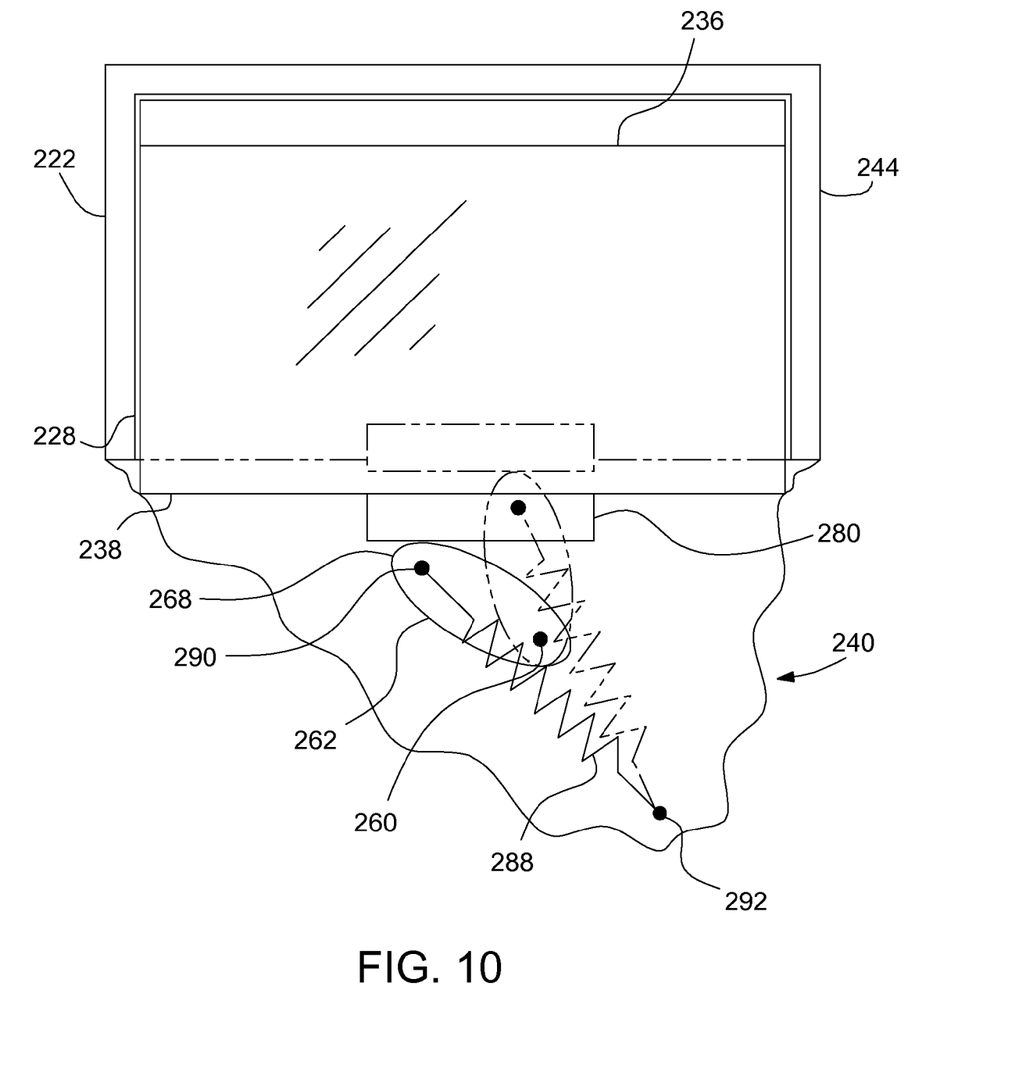
FIG. 10 is a schematic elevation view of a window and support cam according to a third embodiment.

FIG. 10 illustrates a third embodiment of the window mounting bracket assembly 240. Since this embodiment is similar to the first, similar element numbers will be used for similar elements, but employing 200-series numbers. In this embodiment, the window support cam 262 may mount to and pivot relative to the door frame 244, with a cam axis 260 being defined as the location the cam 262 pivots relative to the door frame 244.

A cam spring 288 has a first end 290 that mounts to the window support cam 262 near the cam lobe 268 and a second end 292 that mounts to the door frame 244. The second end 292 is oriented relative to the cam axis 260 such that, when the window support cam 262 is rotated a certain amount in the counterclockwise direction (a pre-installation position shown in FIG. 10 with solid lines), the cam spring 288 will tend to pull the cam further in that direction, and when the cam 262 is rotated a certain amount in the clockwise direction (an installed position shown in FIG. 10 with phantom lines), the cam spring 288 will tend to pull the cam further in this opposite direction. At the inflexion point between the pull in the opposite directions, the orientation of the first end 290 relative to the second end 292 causes the cam spring 288 to be in tension and extending directly over the cam axis 260.

The installation of the window pane 236 will now be discussed. The window support cam 262 is moved to the pre-installation position where it will be held by the cam spring 288 so that the cam lobe 268 is away from the lower edge 238 of the window pane 236. The window pane 236 is then loaded into the window frame 222 by sliding it up in the window run channels between the inner and outer portions of the window seal 228. A glass clip 280, which may include a window support slot, is located between the window support cam 262 and the lower edge 238 of the window pane 236 and the window support cam 262 is rotated clockwise (as seen in FIG. 10) past the inflection point for the cam spring 288, causing the cam lobe 268 to press against the glass clip 280, which in turn pushes up on the window pane 236. The cam spring 288 is sized so that it provides enough force to hold the window pane 236 in its closed position—thus, the cam spring 288 acts as a cam lock for this embodiment. Since the window pane 236 is held by the tension in the spring, a significant range of build variation can be accommodated. Also, the cam spring 288 will accommodate seal set over time and maintain the window pane 236 securely in the upper portion of the window seal 228.

As an alternative, the second end 292 of the cam spring 288, the window support cam 262, and the glass clip 280 may be mounted on a support bracket that attaches to door structure, similar to the other embodiments, if so desired.

While certain embodiments of the present invention have been described in detail, those familiar with the art to which this invention relates will recognize various alternative designs and embodiments for practicing the invention as defined by the following claims.

What is claimed is:

1. A method of fixedly mounting a window pane in a window opening of a vehicle window frame, the method comprising the steps of:
 (a) mounting a window mounting bracket assembly to a vehicle structure adjacent to the window opening;
 (b) sliding the window pane into run channels of the vehicle window frame;
 (c) mounting a lower edge of the window pane onto a support surface above a window support cam of the window mounting bracket assembly;
 (d) rotating a cam lobe of the window support cam causing the support surface to push upward against the lower edge of the window pane until the window pane slides upward through the run channels into a fully closed position; and (e) locking the window support cam, against rotation and allowing the window pane to lower, as the window pane is lifted into the fully closed position, locking the window pane in the fully closed position by said window support cam.

2. The method of claim 1 wherein step (e) is further defined by employing a spring to lock the window support cam against rotation allowing the window pane to lower, locking the window pane in the fully closed position.

3. The method of claim 2 wherein step (e) is further defined by rotationally fixing a ratchet gear to the window support cam, pivoting a ratchet arm into engagement with the ratchet gear to allow rotation of the ratchet gear in only one direction, and operatively engaging the spring to the ratchet arm to bias the ratchet arm into engagement with the ratchet gear.

4. The method of claim 2 wherein step (e) is further defined by the spring being in tension and having a first end and an opposed second end, with the first end connected to the window support cam adjacent to the lobe portion and the second end fixed relative to vehicle structure at a location that will create a pivot inflection point for the window support cam such that when the window support cam is rotated to a first side of the inflection point the lobe portion will be pulled down away from the window pane and when the window support cam is rotated to a second side of the inflection point the lobe portion will be pulled up toward the window pane to thereby support a lower edge of the window pane; and rotating the window support cam to the second side of the inflection point.

5. The method of claim 1 wherein step (a) is further defined by:
providing a plurality of slotted mounting holes located below the window opening, each of the slotted mounting holes having an upper portion and a lower portion that is narrower than the upper portion;
providing a plurality of fasteners extending from the window mounting bracket assembly, each of the fasteners including a head;
inserting each of the heads through a respective one of the upper portions of the slotted mounting holes; and
moving the window bracket mounting assembly downward to secure the heads in the lower portions of the slotted mounting holes.

6. The method of claim 1 wherein step (e) is further defined by inserting a cam lock between a bracket support plate secured to the vehicle structure and the window support cam to prevent rotation of the window support cam relative to the bracket support plate.

7. The method of claim 1 wherein step (b) is further defined by a window seal assembly being mounted in the run channels and defining a gap in the window seal assembly, and sliding the window pane into the gap.

* * * * *